US012621249B2

(12) United States Patent
Liu et al.

(10) Patent No.: US 12,621,249 B2
(45) Date of Patent: May 5, 2026

(54) DATA PROCESSING METHOD, APPARATUS, NETWORK DEVICE AND STORAGE MEDIUM

(71) Applicant: New H3C Technologies Co., Ltd., Hangzhou (CN)

(72) Inventors: Feng Liu, Beijing (CN); Shiyin Zhu, Beijing (CN); Yujun Zhang, Beijing (CN); Zuopin Cheng, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 90 days.

(21) Appl. No.: 18/714,736

(22) PCT Filed: Sep. 29, 2022

(86) PCT No.: PCT/CN2022/122841
§ 371 (c)(1),
(2) Date: May 30, 2024

(87) PCT Pub. No.: WO2024/065481
PCT Pub. Date: Apr. 4, 2024

(65) Prior Publication Data
US 2025/0039106 A1      Jan. 30, 2025

(51) Int. Cl.
*H04L 47/6275* (2022.01)
*H04L 45/00* (2022.01)
(Continued)

(52) U.S. Cl.
CPC .......... *H04L 47/6275* (2013.01); *H04L 45/72* (2013.01); *H04L 45/745* (2013.01); *H04L 47/2408* (2013.01)

(58) Field of Classification Search
CPC ... H04L 47/6275; H04L 45/72; H04L 45/745; H04L 47/2408; H04L 45/302; H04L 45/34; H04L 47/6215; H04L 45/38
(Continued)

(56) References Cited

U.S. PATENT DOCUMENTS 10,218,628 B2 * 2/2019 Bush ..................... H04L 47/125
10,439,871 B2 * 10/2019 Thubert .............. H04L 41/0813
(Continued)

FOREIGN PATENT DOCUMENTS

CN            110336759 B1      10/2019
CN            112448885 B2       3/2021
(Continued)

OTHER PUBLICATIONS

Extended European Search Report issued in corresponding European Application No. 22960117.4, dated Dec. 12, 2024.
(Continued)

*Primary Examiner* — Adil Ocak
(74) *Attorney, Agent, or Firm* — NORTON ROSE FULBRIGHT US LLP

(57) ABSTRACT

A data processing method, apparatus, network device and storage medium are disclosed. The method is applied to a network device in a WAN, wherein the network device is located on a specified path from a gateway of a first data center to a gateway of a second data center. The method comprises: storing the acquired first packet of a target service type in a first scheduling queue corresponding to a deterministic flow to which the packet belongs, the source address of the packet is the address of the first host in the first data center, the destination address of the first packet is the address of the second host in the second data center, and the forwarding path of the deterministic flow to which the first packet belongs is the specified path; forwarding the packet
(Continued)

a second packet is received, wherein the source address of the second packet is the address of a first host in the first data center, and the destination address of the second packet is the address of a second host in the second data center — S101 the target segment list is obtained from the second packet if the second packet is an SRv6 packet, and the network device supports SRv6 — S102 if the segment identifier of the network device in the target segment list corresponds to the first scheduling queue, the second packet is taken as the first packet of the target service type, and the first packet is stored in the first scheduling queue, which is the scheduling queue corresponding to the deterministic flow to which the first packet belongs — S103 the packet is forwarded in the first scheduling queue when the scheduling period of the first scheduling queue is reached — S104 in the first scheduling queue when the scheduling period of the first scheduling queue is reached.

20 Claims, 5 Drawing Sheets

(51) Int. Cl.
　　*H04L 45/745*　　　　(2022.01)
　　*H04L 47/2408*　　　(2022.01)
(58) Field of Classification Search
　　USPC .......................................................... 709/238
　　See application file for complete search history.

(56) References Cited

U.S. PATENT DOCUMENTS

| | | | | | |
|---|---|---|---|---|---|
| 10,506,083 | B2 * | 12/2019 | Filsfils | ................... | H04L 45/741 |
| 10,511,455 | B1 * | 12/2019 | Sharma | ................... | H04L 69/12 |
| 10,594,513 | B2 * | 3/2020 | Camarillo Garvia | ........................ | |
| | | | | | H04L 12/4633 |
| 11,463,905 | B2 * | 10/2022 | Song | ........................ | H04L 69/22 |
| 2003/0016685 | A1 * | 1/2003 | Berggreen | ......... | H04Q 11/0478 |
| | | | | | 370/429 |
| 2014/0269422 | A1 * | 9/2014 | Filsfils | ................... | H04L 49/608 |
| | | | | | 370/254 |
| 2016/0380886 | A1 | 12/2016 | Blair et al. | | |
| 2017/0063674 | A1 | 3/2017 | Maskalik et al. | | |
| 2018/0375766 | A1 * | 12/2018 | Filsfils | ................... | H04L 67/63 |
| 2022/0286395 | A1 * | 9/2022 | Gandhi | ................... | H04L 45/20 |

FOREIGN PATENT DOCUMENTS

| | | | |
|---|---|---|---|
| CN | 113472646 | B3 | 10/2021 |
| CN | 113711572 | B6 | 11/2021 |
| CN | 114080789 | B4 | 2/2022 |
| EP | 4319055 | B7 | 2/2024 |
| WO | WO 2022/146466 | | 7/2022 |

OTHER PUBLICATIONS

International Search Report and Written Opinion issued in Corresponding PCT Application No. PCT /CN2022/122841, dated Nov. 25, 2022 (English Translation provided).

* cited by examiner

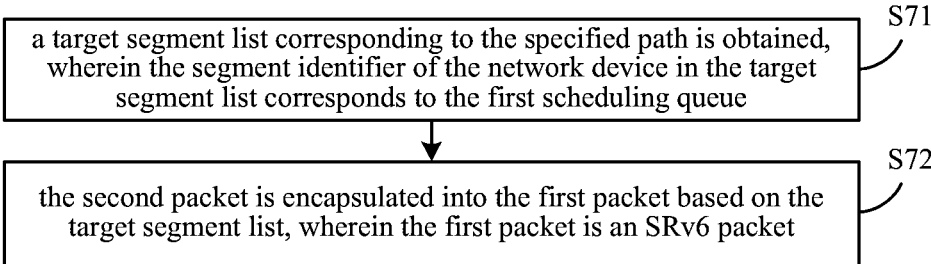

a target segment list corresponding to the specified path is obtained, wherein the segment identifier of the network device in the target segment list corresponds to the first scheduling queue — S71 the second packet is encapsulated into the first packet based on the target segment list, wherein the first packet is an SRv6 packet — S72

FIG. 7

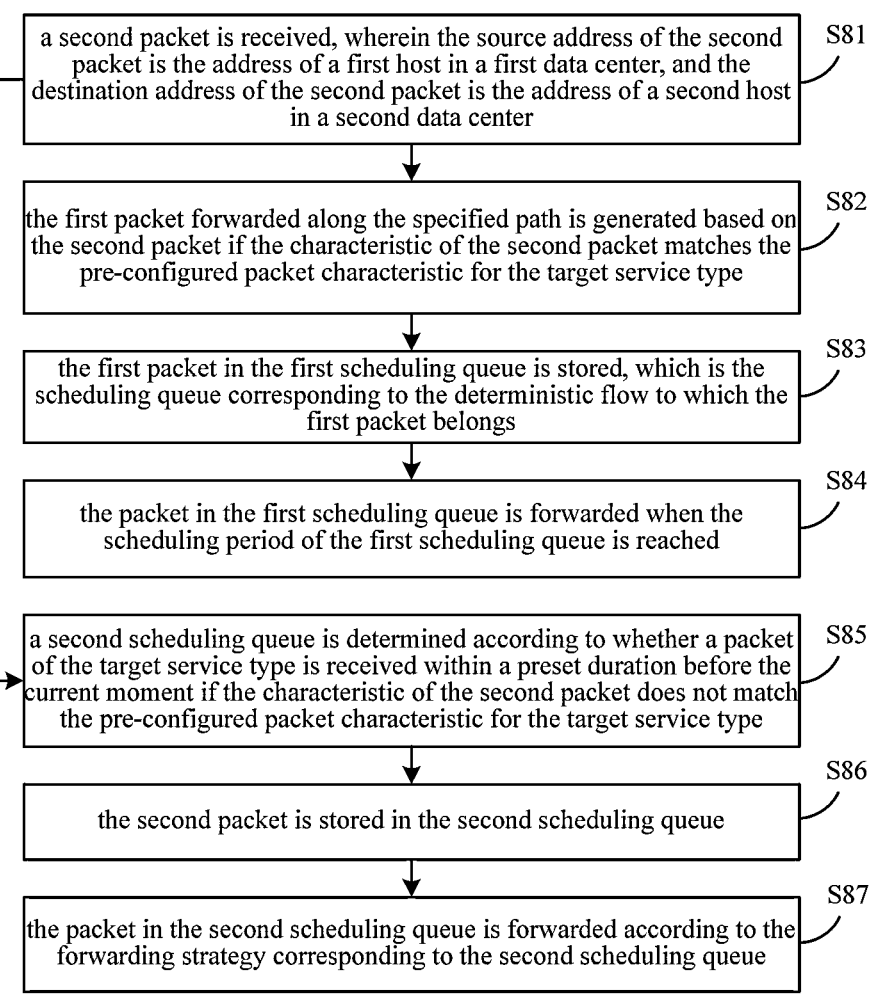

a second packet is received, wherein the source address of the second packet is the address of a first host in a first data center, and the destination address of the second packet is the address of a second host in a second data center — S81 the first packet forwarded along the specified path is generated based on the second packet if the characteristic of the second packet matches the pre-configured packet characteristic for the target service type — S82 the first packet in the first scheduling queue is stored, which is the scheduling queue corresponding to the deterministic flow to which the first packet belongs — S83 the packet in the first scheduling queue is forwarded when the scheduling period of the first scheduling queue is reached — S84 a second scheduling queue is determined according to whether a packet of the target service type is received within a preset duration before the current moment if the characteristic of the second packet does not match the pre-configured packet characteristic for the target service type — S85 the second packet is stored in the second scheduling queue — S86 the packet in the second scheduling queue is forwarded according to the forwarding strategy corresponding to the second scheduling queue — S87

FIG. 8

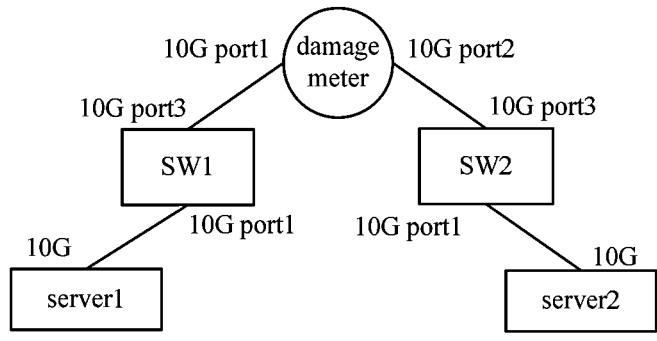
FIG. 12
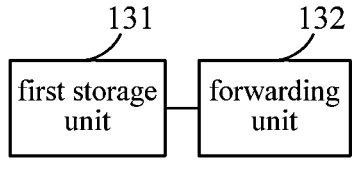
FIG. 13
FIG. 14

DATA PROCESSING METHOD, APPARATUS, NETWORK DEVICE AND STORAGE MEDIUM

CROSS REFERENCE TO RELATED APPLICATION

The present application is a national phase application under 35 U.S.C. § 371 of International Application No. PCT/CN2022/122841, filed Sep. 29, 2022, the entire contents of which are incorporated herein by reference in their entirety.

TECHNICAL FIELD

The application relates to the field of communications, and more particularly to a data processing method, apparatus, a network device and a storage medium.

BACKGROUND

To solve the delay of server-side data processing in network transmission, RDMA (Remote Direct Memory Access) services are developed. RDMA service requires high reliability of network transmission, which is mainly manifested in packet loss and time delay. However, there are many reasons for packet loss in a WAN (wide area network), and its reliability is poor, which leads to the sharp decline in RDMA service performance when transmitting RDMA services based on the WAN.

SUMMARY

The examples of the present disclosure aim to provide a data processing method, apparatus, a network device and a storage medium, so as to reduce the packet loss caused by uncertain time delay and jitter, and to improve the performance of services with high requirements on network transmission reliability, such as RDMA services, when applied to a WAN. Specifically, the technical solutions are as follows.

In a first aspect, an example of the present disclosure provides a data processing method, which is applied to a network device in a WAN, wherein the network device is located on a specified path from a gateway of a first data center to a gateway of a second data center, and the method comprises:

storing an acquired first packet of a target service type in a first scheduling queue corresponding to a deterministic flow to which the first packet belongs, wherein a source address of the first packet is an address of a first host in the first data center, a destination address of the first packet is an address of a second host in the second data center, and a forwarding path of the deterministic flow to which the first packet belongs is the specified path;

forwarding the packet in the first scheduling queue when a scheduling period of the first scheduling queue is reached.

In a second aspect, an example of the present disclosure provides a data processing apparatus, which is applied to a network device in a WAN, wherein the network device is located on a specified path from a gateway of a first data center to a gateway of a second data center, the apparatus comprises:

a first storage unit, to store an acquired first packet of a target service type in a first scheduling queue corresponding to a deterministic flow to which the first packet belongs, wherein a source address of the first packet is an address of a first host in the first data center, a destination address of the first packet is an address of a second host in the second data center, and a forwarding path of the deterministic flow to which the first packet belongs is the specified path;

a forwarding unit, to forward the packet in the first scheduling queue when a scheduling period of the first scheduling queue is reached.

In a third aspect, an example of the present disclosure provides a network device, which comprises a processor and a machine-readable storage medium having stored therein a computer program that can be executed by the processor to cause the processor to perform any of the above data processing methods.

In a fourth aspect, an example of the present disclosure provides a machine-readable storage medium having stored therein a computer program which, when executed by a processor, cause the processor to perform any of the above data processing methods.

In a fifth aspect, an example of the present disclosure provides a computer program which, when executed by a processor, causes the processor to perform any of the above data processing methods.

In the technical solution provided by the example of the present disclosure, a network device in a WAN stores a packet of a target service type with high requirements on network transmission reliability, such as RDMA services, in a specified scheduling queue, and forwards the packet in the scheduling queue when the scheduling period of the scheduling queue is reached. Because the scheduling period of the specified scheduling queue is determined, forwarding the packet of the target service type with high requirements on network transmission reliability in the scheduling period of the specified scheduling queue can ensure that the transmission delay and jitter of the packet of the target service type are limited, realize the deterministic and bounded time delay transmission of the packet of the target service type, reduce the packet loss caused by uncertain time delay and jitter, and improve the performance of RDMA services and other services with high requirements on network transmission reliability when applied to the WAN.

It should be understood that any product or method for implementing the present disclosure does not necessarily require all of the advantages described above.

BRIEF DESCRIPTION OF DRAWINGS

In order to more clearly describe the technical solution of the examples of the present disclosure and the prior art, drawings needed in the examples and the prior art will be briefly described below. Obviously, the drawings described below are for only some examples of the present disclosure, one of ordinary skills in the art can also obtain other drawings based on the drawings illustrated herein without any creative efforts.

3                                                              4

Figure 6:
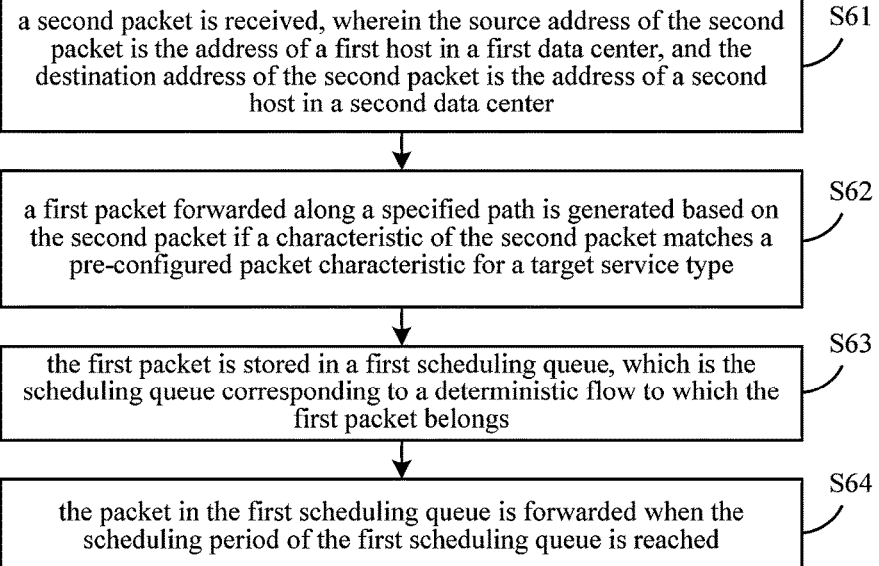
Figure 9:
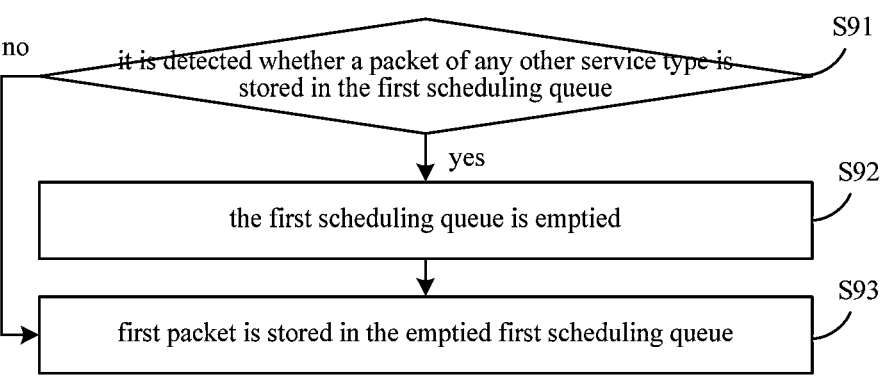
Figure 10:
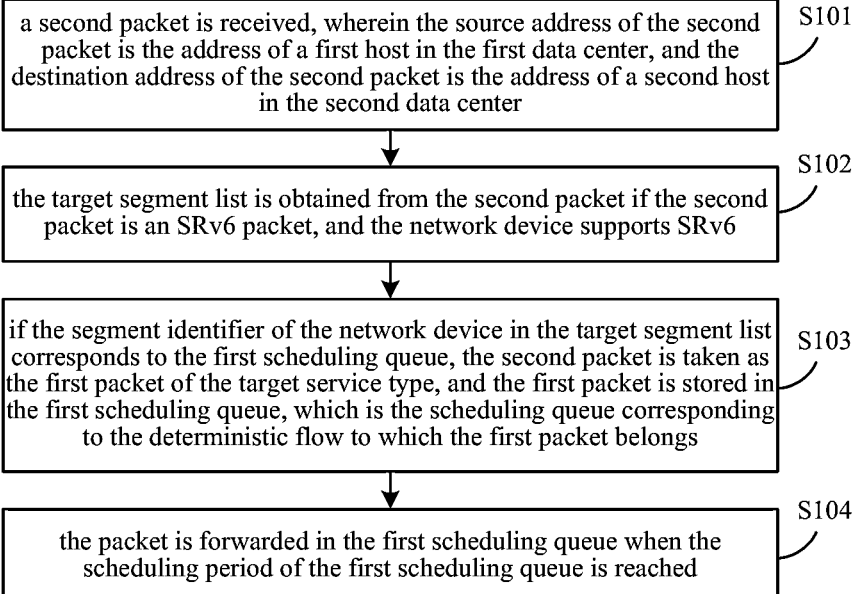
Figure 11:
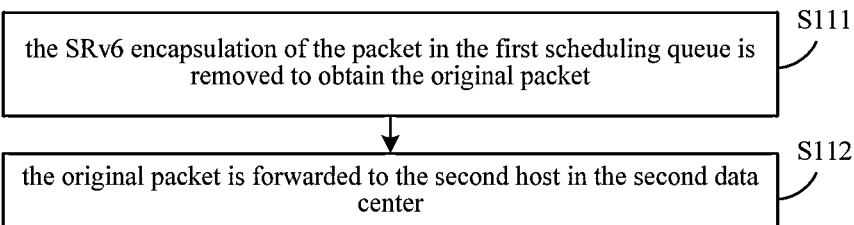

FIG. 6 is a schematic flow chart of a second data processing method provided by an example of the present disclosure;

FIG. 7 is a detailed schematic diagram of block S62 in FIG. 6;

FIG. 8 is a schematic flow chart of a third data processing method provided by an example of the present disclosure;

FIG. 9 is a detailed schematic diagram of block S63 in FIG. 6 and block S83 in FIG. 8;

FIG. 10 is a schematic flow chart of a fourth data processing method provided by an example of the present disclosure;

FIG. 11 is a detailed schematic diagram of block S104 in FIG. 10;

FIG. 12 is a schematic diagram of an actual tested network topology provided by an example of the present disclosure;

FIG. 13 is a schematic structural diagram of a data processing apparatus provided by an example of the present disclosure;

FIG. 14 is a schematic structural diagram of a network device provided by an example of the present disclosure.

DETAILED DESCRIPTION

In order to make objectives, technical solutions and advantages of the present disclosure more apparent, the present disclosure now will be described in detail with reference to the accompanying drawings and by way of examples. Obviously, the examples described herein are only some of the examples of the present disclosure instead of all of them. All other examples obtained by those of ordinary skills in the art based on the examples herein without any creative efforts are within the scope of the present disclosure.

For the convenience of understanding, the terms appearing in the example of the present disclosure are explained below.

RDMA (Remote Direct Memory Access): it aims to solve the delay of server-side data processing in network transmission; RDMA service allows user-mode applications to directly read from or write into a remote memory without kernel intervention and memory copying.

RoCE (RDMA over Converged Ethernet): it is a network protocol that allows RDMA to be used over Ethernet.

SRv6 (Segment Routing IPv6): it is a new generation IP (Internet Protocol) bearer protocol. SRv6 adopts the existing IPv6 forwarding technology and realizes network programmability through flexible IPv6 extension header.

Figure 1:
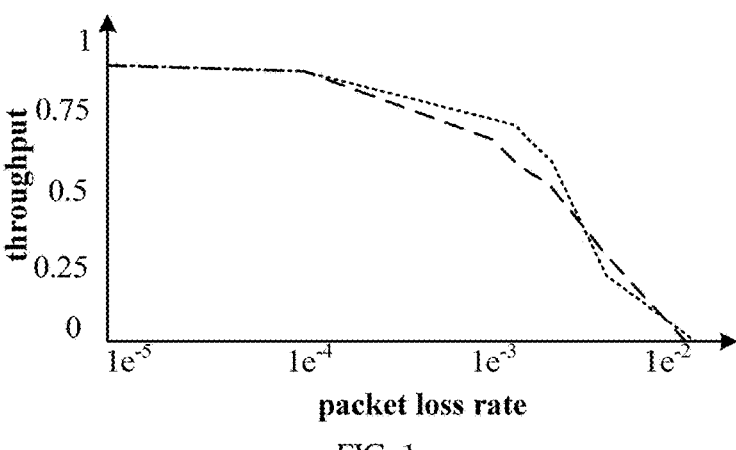
FIG. 1 is a schematic diagram of the throughput of RDMA service read and write operations.

RDMA service puts forward very high requirements on network transmission, which is mainly manifested in the packet loss of the network. For different packet loss rates, the throughput of RDMA service read and write operations is shown in FIG. 1. In FIG. 1, the short dashed line indicates the throughput of a read operation, and the long dashed line indicates the throughput of a write operation. As can be seen from FIG. 1, the RDMA service is extremely sensitive to packet loss in Ethernet. When the packet loss rate in Ethernet exceeds 10-3, the effective throughput of the network drops sharply (the effective throughput is only about 75%). When the packet loss rate in Ethernet drops to 1%, the throughput of the RDMA service drops to 0. According to FIG. 1, if it is desired that the throughput of the RDMA service is not affected, the packet loss rate needs to be less than one in 100,000, preferably there is no packet loss.

Figure 2:
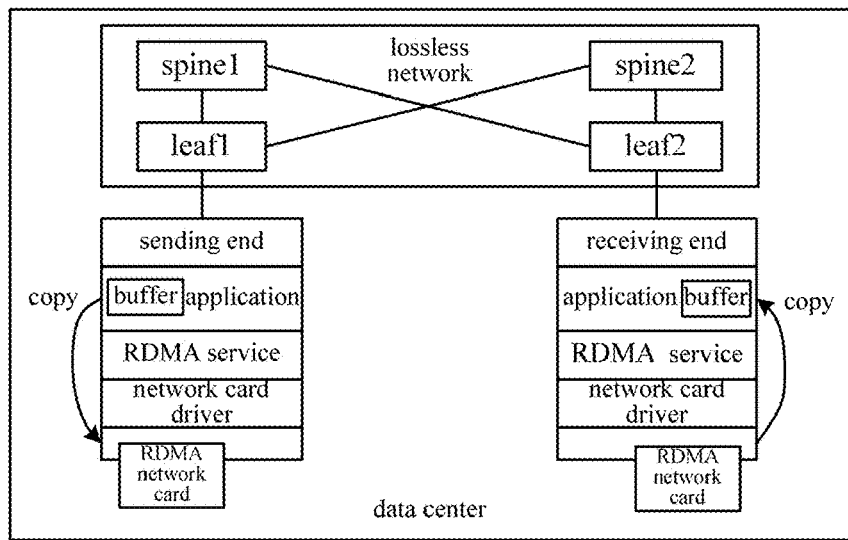
FIG. 2 is a schematic diagram of RDMA service transmission in a data center.

At present, RDMA services are mainly used in data centers, and are transmitted through lossless network combined with RoCE technology. As shown in FIG. 2, all communication parties (comprising sending end and receiving end) belong to the same data center 1, and the lossless network comprises multiple spine nodes, such as spine1 and spine2 in FIG. 2, and also comprises multiple leaf nodes, such as leaf1 and leaf2 in FIG. 2. The sending end and the receiving end are respectively provided with RDMA network cards. After the sending end copies the packet data of the RDMA service of the application from the buffer to the RDMA network card, the network card driver drives the DMA network card to complete the transmission of the packet data of the RDMA service through the lossless network, and the receiving end drives the DMA network card by the network card driver to complete the reception of the packet data of the RDMA service through the lossless network and copy the packet data of the RDMA service to the buffer of the application.

Figure 3:
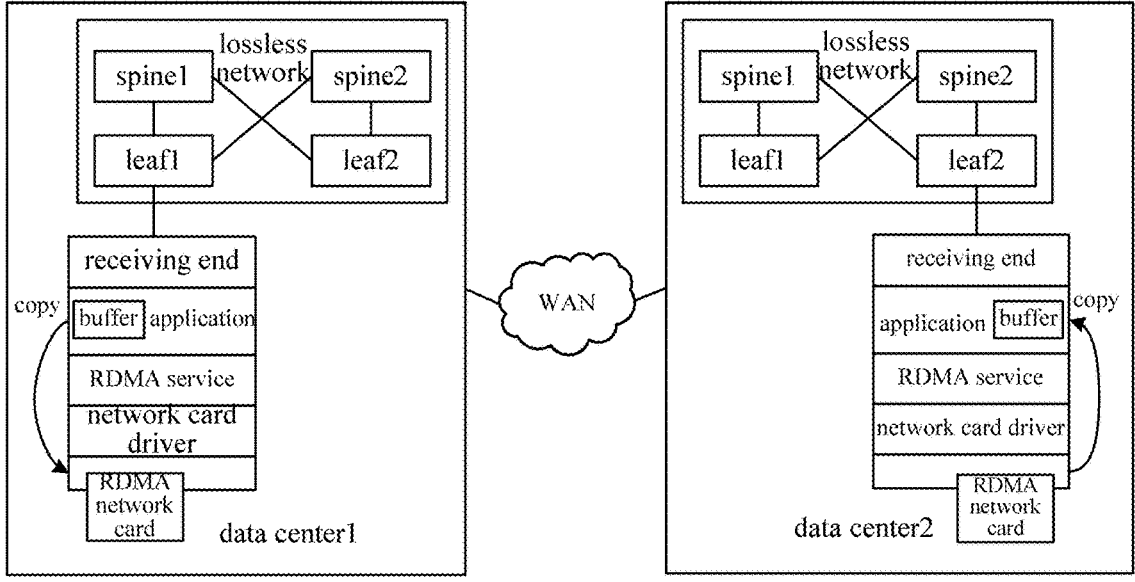
FIG. 3 is a schematic diagram of RDMA service transmission between data centers.

With the development of edge computing and 5G MEC (Mobile Edge Computing) sinking the computing power to the edge and the great development of integrated big data centers, the service interaction between data centers and edge computing centers is getting closer and closer. The application scenario of RDMA services expand also from inside a data center to between a data center and an edge computing center. In this scenario, WAN is needed to connect the data center and the edge computing center, which makes the communication parties of RDMA services distributed in different locations, as shown in FIG. 3 below.

Without changing the existing implementation mechanism of an RDMA service, the RDMA service also puts forward the same requirements on the WAN connected between a data center and an edge computing center, which are mainly manifested in packet loss and time delay. There are many reasons for packet loss in WAN, one of which is excessive jitter caused by congestion, and the packet of an RDMA service is misjudged to be lost, which leads to the whole packet data of the RDMA service being retransmitted; in addition, in terms of time delay, if the time delay is sometimes big and sometimes small, it will also lead to a sharp decline in RDMA service performance. WAN carries a large number of various types of services, comprising video, voice, file transmission, etc. When WAN provides the best-effort network capability, different services affect each other, and the packets of RDMA services are easily affected by various large bandwidth transmission services, resulting in large jitter and even packet loss, which leads to a sharp decline in the performance of RDMA services.

Figure 4:
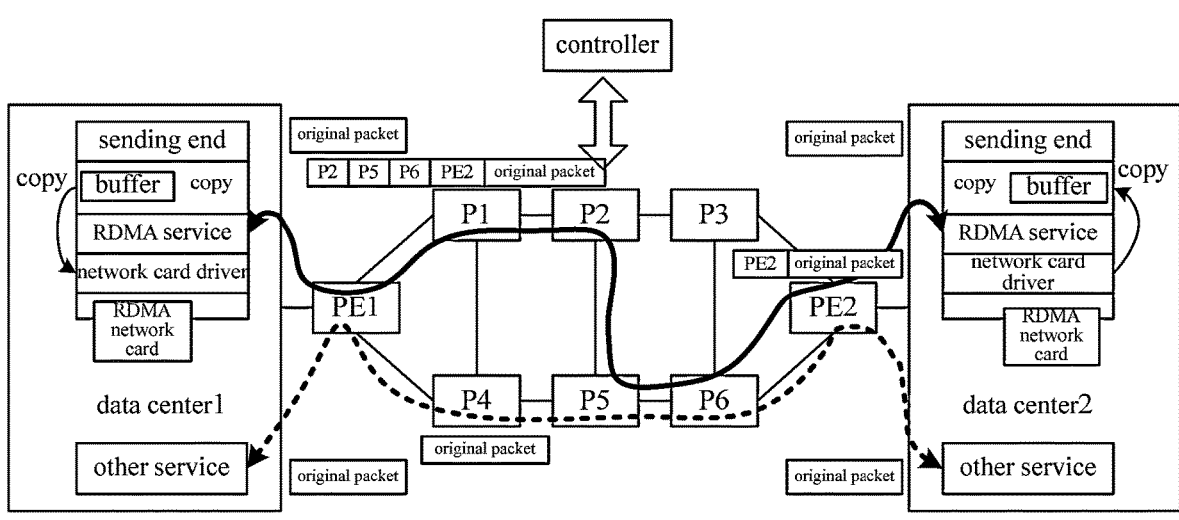
FIG. 4 is a schematic diagram of a network architecture provided by an example of the present disclosure.

To solve the above problems, an example of the present disclosure provides a data processing method, which is applied to a network device in a WAN, which network device is located on a specified path from the gateway of the first data center to the gateway of the second data center, and the specific network architecture can be seen in FIG. 4. In FIG. 4, the WAN comprises PE (Provider Edge) 1-PE2 and P (Provider) 1-P6, with PE1 being the gateway of data center 1 and PE2 being the gateway of data center 2. When any network device in PE1-PE2 and P1-P6 is located on the specified path, the data processing method provided by the example of the present disclosure can be implemented.

In this example of the present disclosure, the first data center and the second data center are any two data centers connected through a WAN, that is, the first data center and the second data center are located in different regions, such as data center 1 and data center 2 shown in FIG. 4. The specified path is a predetermined path for transmitting packets from the gateway of the first data center to the gateway of the second data center, as shown in the thick solid line with double arrows in FIG. 4. The network device may be the gateway of the first data center, the gateway of the second data center, or an intermediate device, and the intermediate device is a network device other than the gateway of the first data center and the gateway of the second data center on a specified path, such as P1, P2, P5 and P6 in FIG. 4. The network device can be a router, a switch, a firewall device and another device with a communication function.

In the data processing method provided by the example of the present disclosure, the network device in the WAN stores the packet of the target service type with high requirements on network transmission reliability, such as RDMA services, in a specified scheduling queue, and forwards the packet in the scheduling queue when the scheduling period of the scheduling queue is reached. Because the scheduling period of the specified scheduling queue is determined, forwarding the packet of the target service type with high requirements on network transmission reliability in the scheduling period of the specified scheduling queue can ensure that the transmission delay and jitter of the packet of the target service type are limited, realize the deterministic and bounded delay transmission of the packet of the target service type, reduce the packet loss caused by uncertain time delay and jitter, and improve the performance of the RDMA services and other services with high requirements on network transmission reliability when applied to a WAN.

The data processing method provided by the example of the present disclosure will be explained in detail through the following specific examples.

Figure 5:
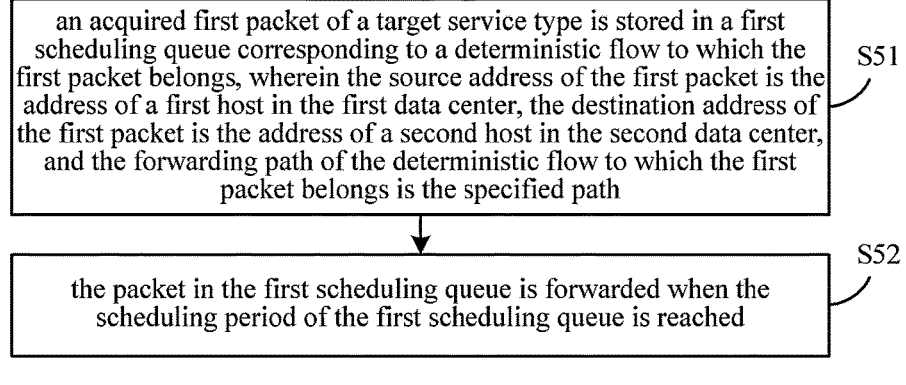
FIG. 5 is a first schematic flow chart of a data processing method provided by an example of the present disclosure.

As shown in FIG. 5, FIG. 5 is a first schematic flow chart of a data processing method provided by an example of the present disclosure. The method is applied to a network device in a WAN, and the network device is located on a specified path from the gateway of a first data center to the gateway of a second data center, comprising the following blocks.

In block S51, an acquired first packet of a target service type is stored in a first scheduling queue corresponding to a deterministic flow to which the first packet belongs, wherein the source address of the first packet is the address of a first host in the first data center, the destination address of the first packet is the address of a second host in the second data center, and the forwarding path of the deterministic flow to which the first packet belongs is the specified path.

In block S52, the packet in the first scheduling queue is forwarded when the scheduling period of the first scheduling queue is reached.

In the data processing method provided by the example of the present disclosure, the network device in the WAN stores the packet of the target service type with high requirements on network transmission reliability, such as RDMA services, in a specified scheduling queue, and forwards the packet in the scheduling queue when the scheduling period of the scheduling queue is reached. Because the scheduling period of the specified scheduling queue is determined, forwarding the packet of the target service type with high requirements on network transmission reliability in the scheduling period of the specified scheduling queue can ensure that the transmission delay and jitter of the packet of the target service type are limited, realize the deterministic and bounded delay transmission of the packet of the target service type, reduce the packet loss caused by uncertain time delay and jitter, and improve the performance of RDMA services and other services with high requirements on network transmission reliability when applied to the WAN.

In addition, in the data processing method provided by the example of the present disclosure, only by improving the software of the network device, the packet in the corresponding scheduling queue can be forwarded according to the specified scheduling period, and the deterministic and bounded time delay transmission of the service packet with high requirements on network transmission reliability can be realized. Compared with adopting the complexity technology in which expensive hardware is arranged on the network device to be specially used for transmitting service packets with high requirements on network transmission reliability, the technical solution provided by the example of the present disclosure reduces the requirements on the network device and saves the network deployment cost.

In the above block S51, the service flow of the target service type may be the service flow of an RDMA service, or the service flow of any other service type with high requirements on network transmission reliability. There can be one or more service flows of the target type. One service flow of the target service type corresponds to one scheduling queue, and one scheduling queue can correspond to one or more service flows of the target service type, and the scheduling queue is used for buffering the received packets. The first packet is a packet of a service flow of a target service type, and the first packet can be a packet of the target service type sent by any host in the first data center to any host in the second data center. The service flow to which the first packet belongs is a deterministic flow, and the forwarding path of the deterministic flow to which the first packet belongs is the specified path, that is, the first packet is forwarded along the specified path. In this example of the present disclosure, any host in the first data center is the first host, and any host in the second data center is the second host, which is not intended to limit the present disclosure. There may be multiple deterministic flows of target service types transmitted between the first host and the second host, and the forwarding paths of this deterministic flow may be the same or different, and the scheduling queues corresponding to this deterministic flow may be the same or different.

In order to reduce packet loss in the network and realize lossless transmission and deterministic transmission, a lossless network can be used to transmit packets inside a data center. For example, a host in the first data center transmits packets to the gateway of the first data center through the lossless network. For example, the gateway of the second data center transmits the packet to the host in the second data center through the lossless network. The structure of the lossless network can be found in the lossless network structure in FIG. 2 and FIG. 3 above. In this example of the present disclosure, the lossless network can be configured by an ECN (Explicit Congestion Notification), PFC (Priority Flow Control), DCBX (Data Center Bridging Exchange) and other technologies, which are not limited.

After acquiring the first packet of the target service type, the network device performs mapping and deterministic processing scheduling, that is, determines the scheduling queue corresponding to the service to which the first packet belongs, that is, determines the scheduling queue corresponding to the deterministic flow to which the first packet belongs. For the convenience of distinction and understanding, in the example of the present disclosure, the scheduling queue corresponding to the deterministic flow to which the packet of the target service type belongs is called the first scheduling queue, which is not intended to limit the present disclosure. The network device stores the first packet into the first scheduling queue.

In the above block S52, each scheduling queue corresponding to the deterministic flow of the target service type is configured with a scheduling period, and the scheduling period indicates the period for forwarding the packet in the corresponding scheduling queue. In this example of the present disclosure, in the network device, the scheduling period of the scheduling queue can be set by a controller according to packet transmission requirements, and can also be configured by the network device itself according to the initial time of starting the scheduling queue, link time delay and other information.

The network device performs smooth shaping on the packet according to the period, for example, it can monitor the scheduling period of each scheduling queue in real time, and when the scheduling period of the first scheduling queue is monitored, the packet stored in the first scheduling queue, such as the above-mentioned first packet, is forwarded. As described in the above block S51, the forwarding path of the deterministic flow to which the first packet belongs is the specified path, so when forwarding the first packet stored in the first scheduling queue, the first packet is actually forwarded along the specified path.

In this example of the present disclosure, the network device may be a gateway of the first data center, an intermediate device or a gateway of the second data center. When the network devices are different types of devices, their data processing methods are different.

In some examples, when the network device is the gateway of the first data center, based on the example shown in FIG. 5, an example of the present disclosure also provides a data processing method, as shown in FIG. 6, which can comprise the following blocks.

In block S61, a second packet is received, wherein the source address of the second packet is the address of a first host in a first data center, and the destination address of the second packet is the address of a second host in a second data center.

In block S62, a first packet forwarded along a specified path is generated based on the second packet if a characteristic of the second packet matches a pre-configured packet characteristic for a target service type.

In block S63, the first packet is stored in a first scheduling queue, which is the scheduling queue corresponding to a deterministic flow to which the first packet belongs.

In block S64, the packet in the first scheduling queue is forwarded when the scheduling period of the first scheduling queue is reached. Block S64 is same as the above block S52.

In the example of the present disclosure, the network device, that is, the gateway of the first data center, identifies the packet of the target service type, and only transmits the packet of the target service type deterministically, but does not transmit the packet of other service types deterministically, which reduces the requirements of the network device and saves the bandwidth resources of the network device.

In block S61, the second packet may be a packet sent by any host in the first data center to any host in the second data center. That is, any host in the first data center can use lossless network technology to send the original packet to the gateway of the first data center. The gateway of the first data center receives the original packet sent by any host in the first data center, and the original packet received by the gateway of the first data center is the second packet. In this example of the present disclosure, any host in the first data center is the first host, and any host in the second data center is the second host, for example, which is not intended to limit the present disclosure.

In the above block S62, the packet characteristic may comprise, but are not limited to, information such as port number, quintuple, etc. After receiving the second packet, the gateway of the first data center extracts the characteristic of the second packet, identifies the packet of the target service type, that is, matches the characteristic of the second packet with the pre-configured packet characteristic for the target service type; if the characteristic of the second packet match the pre-configured packet characteristic for the target service type, that is, the characteristic of the second packet are the same as the pre-configured packet characteristic for the target service type, it means that the second packet is a packet of the target service type, and then a first packet is generated based on the second packet, which is forwarded along the specified path.

In block S63, after the first packet is generated in block S62, the gateway of the first data center can determine the first scheduling queue corresponding to the deterministic flow to which the first packet belongs, that is, determine the first scheduling queue corresponding to the first packet, and then store the first packet in the first scheduling queue.

In some examples, as shown in FIG. 7, the block of generating the first packet forwarded along the specified path in the above block S62 may comprise blocks S71-S72.

In block S71, a target segment list corresponding to the specified path is obtained, wherein the segment identifier of the network device in the target segment list corresponds to the first scheduling queue.

In this example of the present disclosure, the gateway of the first data center can preset a segment list, i.e., segment identifier (SID) list, corresponding to the deterministic flow to which the packet of the target service type belongs, and the SID list corresponds to the specified path. In the SID list, the SID information of the gateway of the first data center indicates the scheduling queue corresponding to the corresponding deterministic flow.

After receiving the second packet and determining that the second packet is the packet of the target service type, the gateway of the first data center obtains the segment list corresponding to the deterministic flow to which the second packet belongs, that is, the target segment list corresponding to the specified path, from the pre-stored segment list.

For example, the correspondence between the packet characteristic and the segment list is pre-stored in the gateway of the first data center. The gateway of the first data center extracts the characteristic of the second packet, and then obtains the segment list corresponding to the characteristic of the second packet as the target segment list according to the pre-stored correspondence between the packet characteristic and the segment list.

In block S72, the second packet is encapsulated as the first packet based on the target segment list, wherein the first packet is an SRv6 packet.

The gateway of the first data center encapsulates the second packet as the first packet after obtaining the target segment list, for example, the second packet is encapsulated with an SRv6 header, which comprises the target segment list, and the second packet encapsulated with the SRv6 header is the first packet.

In the technical solution provided by the example of the present disclosure, the gateway of the first data center encapsulates the packet from the first data center as an SRv6 packet, and the header of the SRv6 packet comprises a segment list, which can uniquely indicate one path, namely the above-mentioned specified path, thus ensuring the deterministic transmission of the first packet.

In some examples, the controller may calculate the time delay and jitter of each path from the gateway of the first data center to the gateway of the second data center in advance, determine the path that meets the transmission indicator of the deterministic flow to which the first packet belongs, that is, the specified path, and then configure the route in each intermediate device on the specified path, so that the intermediate device can forward the first packet along the specified path when querying the route to forward the first packet after receiving the first packet.

In this case, the gateway of the first data center can obtain the first SID of the gateway of the first data center and the second SID of the gateway of the second data center, and encapsulate the second packet as the first packet based on the first SID and the second SID, wherein the first packet is an SRv6 packet. At this time, the SRv6 header of the first packet may comprise an SRH (Segment Routing Header) or not. If the SRv6 header of the first packet comprises an SRH, the SRH in the SRv6 header of the first packet comprises a first SID and a second SID, and the source IP address of the IPv6 basic header in the SRv6 header of the first packet is the first SID and the destination IP address is the second SID; if the SRv6 header of the first packet comprises an SRH, the source IP address of the IPv6 basic header in the SRv6 header of the first packet is the first SID, and the destination IP address is the second SID.

At this time, the gateway of the first data center can determine the first scheduling queue based on the source IP address of the IPv6 basic header, and then store the first packet in the first scheduling queue. Accordingly, the gateway of the second data center can determine the first scheduling queue based on the destination IP address of the IPv6 basic header, and then store the first packet in the first scheduling queue.

In this example of the present disclosure, the gateway of the first data center can also generate the first packet forwarded along the specified path in other ways, which is not limited.

In some examples, based on the example shown in FIG. 6, an example of the present disclosure also provides a data processing method, as shown in FIG. 8, which can comprise the following blocks.

In block S81, a second packet is received, wherein the source address of the second packet is the address of a first host in a first data center, and the destination address of the second packet is the address of a second host in a second data center.

In block S82, the first packet forwarded along the specified path is generated based on the second packet if the characteristic of the second packet matches the pre-configured packet characteristic for the target service type.

In block S83, the first packet in the first scheduling queue is stored, which is the scheduling queue corresponding to the deterministic flow to which the first packet belongs.

In block S84, the packet in the first scheduling queue is forwarded when the scheduling period of the first scheduling queue is reached.

Blocks S81-S84 are the same as the above blocks S61-S64.

In block S85, a second scheduling queue is determined according to whether a packet of the target service type is received within a preset duration before the current moment if the characteristic of the second packet does not match the pre-configured packet characteristic for the target service type.

In block S86, the second packet is stored in the second scheduling queue.

If the characteristic of the second packet does not match the pre-configured packet characteristic for the target service type, that is, the characteristic of the second packet is different from the pre-configured packet characteristic for the target service type, it means that the second packet is not a packet of the target service type, and the gateway of the first data center can determine a scheduling queue in the scheduling queue of the network device as the second scheduling queue according to whether a packet of a target service type is received within a preset duration before the current moment, and store the second packet in the second scheduling queue.

In this example of the present disclosure, when the second packet is not a packet of the target service type, the gateway of the first data center can also determine the second scheduling queue corresponding to the characteristic of the second packet according to the pre-stored correspondence between the packet characteristic and the scheduling period, and then store the second packet in the second scheduling queue.

When the second packet is not a packet of the target service type, the gateway of the first data center can also determine the second scheduling queue corresponding to the time slot for receiving the second packet according to the pre-stored correspondence between the time slot and the scheduling period, and then store the second packet in the second scheduling queue.

There can be other ways for the gateway of the first data center to determine the second scheduling queue, such as randomly selecting a scheduling queue as the second scheduling queue, which is not limited.

In addition, in the example of the present disclosure, the scheduling queue range of the second scheduling queue can be adjusted according to the actual situation. For example, the gateway of the first data center can detect whether a packet of the target service type is received within a preset duration before the current moment. If the packet of the target service type is not received within the preset duration before the current moment, it means that there is the packet of the target service type in the current WAN, and the scheduling queue range of the second scheduling queue is determined to be all scheduling queues in the network device, that is, the second scheduling queue is determined from all scheduling queues in the network device. If the packet of the target service type is received within the preset duration before the current moment, it means that there is no packet of the target service type in the current WAN, and the scheduling queue range of the second scheduling queue is determined to be all scheduling queues in the network device except the first scheduling queue, that is, the second scheduling queue is determined from all scheduling queues in the network device except the first scheduling queue. According to the example of the present disclosure, the gateway of the first data center preferably uses the first scheduling queue for the packet of the target service type, thus ensuring the deterministic transmission of the packet of the target service type and improving the availability of queue resources.

In addition, in the example of the present disclosure, the gateway of the first data center can pre-configure the packet forwarding mode of a non-target service type. When the second packet is stored in the second scheduling queue, the gateway of the first data center can process the second packet according to the pre-configured packet forwarding mode of the non-target service type, and store the processed second packet in the second scheduling queue.

The above packet forwarding mode can be set according to the actual requirements of non-target service types.

For example, the packet forwarding mode may be to forward the original packet, in which case, the gateway of the first data center will directly store the received second packet to the second scheduling queue.

For example, the packet forwarding mode may be to forward the SRv6 packet, in which case, the gateway of the first data center will encapsulate the received second packet as an SRv6 packet, and store the encapsulated second packet in the second scheduling queue. The SRv6 header of the encapsulated second packet may or may not comprise an SRH.

In this example of the present disclosure, if the encapsulated second packet is an SRv6 packet and the first packet is also an SRv6 packet, even though the forwarding paths of the second packet and the first packet are the same, the information carried in the SRv6 header of the encapsulated second packet and the first packet will be different. For example, the segment identifier of the gateway of the first data center in the segment list of the first packet corresponds to a scheduling queue, while there is no scheduling queue corresponding to the segment identifier of the gateway of the first data center in the segment list of the second packet. Based on this, it is convenient for the intermediate device on the specified path and the gateway of the second data center to distinguish the packet of the target service type from the packet of the non-target service type.

In block S87, the packet in the second scheduling queue is forwarded according to the forwarding strategy corresponding to the second scheduling queue.

In this example of the present disclosure, the forwarding strategy corresponding to the second scheduling queue can be first-in-first-out, that is, the gateway of the first data center can extract the packets in the second scheduling queue in a first-in-first-out mode, then query the routing table and forward the packets in the second scheduling queue according to the query result. For example, the gateway of the first data center stores two scheduling queues, namely queue 1 and queue 2. The gateway of the first data center stores the packet of non-target service type in queue 1 first, and then stores the packet of non-target service type in queue 2. When forwarding the packet, the gateway of the first data center forwards the packet stored in queue 1 first, and then converts the packet stored in queue 2.

The forwarding strategy corresponding to the second scheduling queue can also be forwarding according to the scheduling period of the scheduling queue, that is, when the gateway of the first data center reaches the scheduling period of the second scheduling queue, it can extract the packets in the second scheduling queue, then query the routing table and forward the packets in the second scheduling queue according to the query result.

In this example of the present disclosure, the forwarding strategy corresponding to the second scheduling queue may be in other forms, which is not limited.

In the technical solution provided by the example of the present disclosure, when the second packet is not a packet of the target service type, the gateway of the first data center queries the routing table according to the corresponding forwarding strategy, so as to realize the forwarding of the packet of the non-target service type, and the time and space resources will not be fixedly occupied, thus ensuring the deterministic forwarding of the packet of the target service type.

In some examples, as shown in FIG. 9, the above blocks S63 and S83 may comprise blocks S91-S93.

In block S91, it is detected whether a packet of any other service type is stored in the first scheduling queue. If yes, block S92 is executed; if not, it means that the first scheduling queue is the emptied first scheduling queue, and block S93 is executed.

In block S92, the first scheduling queue is emptied.

The first scheduling queue is a scheduling queue reserved for packets of the target service type. To improve the availability of the storage space of the network device, the gateway of the first data center can store the packets of other service types in the first scheduling queue when there are no packets of the target service type in the current WAN, as described in blocks S85-S86.

When a packet of the target service type is received, such as the first packet, it means that there is no packet of the target service type in the current WAN, and the gateway of the first data center empties the first scheduling queue, such as discards packets of other service types stored in the first scheduling queue, or transferring packets of other service types stored in the first scheduling queue to other scheduling queues.

In block S93, the first packet is stored in the emptied first scheduling queue.

In the technical solution provided by the example of the present disclosure, after empting the first scheduling queue, the gateway of the first data center stores the first packet in the first scheduling queue, which prevents packets of other service types from occupying deterministic transmission resources and ensures the deterministic transmission of packets of the target service type.

In some examples, when the network device is an intermediate device on the specified path or the gateway of the second data center, based on the example shown in FIG. 5, an example of the present disclosure also provides a data processing method, as shown in FIG. 10, which can comprise the following blocks.

In block S101, a second packet is received, wherein the source address of the second packet is the address of a first host in the first data center, and the destination address of the second packet is the address of a second host in the second data center.

In block S102, the target segment list is obtained from the second packet if the second packet is an SRv6 packet, and the network device supports SRv6.

In block S103, if the segment identifier of the network device in the target segment list corresponds to the first scheduling queue, the second packet is taken as the first packet of the target service type, and the first packet is stored in the first scheduling queue, which is the scheduling queue corresponding to the deterministic flow to which the first packet belongs.

In block S104, the packet is forwarded in the first scheduling queue when the scheduling period of the first scheduling queue is reached. Block S104 is same as the above block S52.

In the technical solution provided by the example of the present disclosure, the gateway of the first data center encapsulates the packet from the first data center as an SRv6 packet, and the header of the SRv6 packet comprises a segment list, which can uniquely indicate one path, namely the above-mentioned specified path, thus ensuring the deterministic transmission of the packet of the target service type.

Operations performed by the intermediate device and the gateway of the second data center are similar, and the following description takes the intermediate device as the executive subject, which is not intended to limit the present disclosure.

In block S101, the second packet received by the intermediate device or the gateway of the second data center is a packet forwarded by a host in the first data center through the gateway of the first data center. The second packet received by the intermediate device or the gateway of the second data center may be an original packet of a non-target service type forwarded by the gateway of the first data center, or the first packet of the target service type processed by the gateway of the first data center, or a packet obtained by encapsulating a packet of a non-target service type.

In block S102, the packet of the target service type is an SRv6 packet. When the intermediate device monitors that the second packet is an SRv6 packet, and the intermediate device supports SRv6, the second packet is parsed to obtain the target segment list carried by the second packet. The gateway of the first data center encapsulates the packet of the target service type as an SRv6 packet, and then transmits the SRv6 packet. For the way that the gateway of the first data center obtains the SRv6 packet of the target service type, please refer to the example shown in FIG. 7 above.

In this case, if the second packet is not the SRv6 packet, it can be considered that the second packet is a packet of a non-target service type, and the intermediate device determines the second scheduling queue according to whether a packet of a target service type is received within a preset duration before the current moment, and stores the second packet in the second scheduling queue; and forwards the packet in the second scheduling queue according to the forwarding strategy corresponding to the second scheduling queue. Here, for the specific implementation of storing the second packet in the second scheduling queue and forwarding the packet in the second scheduling queue, please refer to the related description of the above blocks S85-S87, which will not be repeated here.

In the above block S103, the intermediate device can pre-store the SID list corresponding to the deterministic flow to which the packet of the target service type belongs, and the SID information of the intermediate device in the SID list indicates the scheduling queue corresponding to the corresponding deterministic flow. After obtaining the target segment list, the intermediate device determines the scheduling queue corresponding to the segment identifier of the intermediate device in the target segment list, that is, the first scheduling queue corresponding to the deterministic flow to which the first packet belongs. If the first scheduling queue is determined, it can mean that the second packet is the first packet of the target service type, and then the first packet is stored in the first scheduling queue.

The SRv6 packet of the target service type may also carry indication information, which indicates that the segment identifier of this intermediate device in the target segment list corresponds to the first scheduling queue. The indication information can be added in the SID list or in any position of the load of the packet. In this case, after obtaining the target segment list, the intermediate device determines whether the first packet carries the above indication information. If so, the first packet can be stored in the first scheduling queue indicated by the indication information.

If the second packet is an SRv6 packet, and the intermediate device supports SRv6, but no target segment list is obtained from the second packet, or the first scheduling queue corresponding to the segment identifier of this intermediate device in the target segment list is not determined, that is, there is no scheduling queue corresponding to the segment identifier of the intermediate device in the target segment list, then the second packet can be considered as a packet of a non-target service type, and the intermediate device determines the second scheduling queue according to whether a packet of a target service type is received within the preset duration before the current moment; forwards the packet in the second scheduling queue according to the forwarding strategy corresponding to the second scheduling queue. Here, for the specific implementation of storing the second packet in the second scheduling queue and forwarding the packet in the second scheduling queue, please refer to the related description of the above blocks S85-S87, which will not be repeated here.

In some examples, if the intermediate device does not support SRv6, the intermediate device does not need to determine whether the second packet is a packet of the target service type, and instead can directly determine the second scheduling queue according to whether a packet of a target service type is received within a preset duration before the current moment, and store the second packet in the second scheduling queue; and forward the packet in the second scheduling queue according to the forwarding strategy corresponding to the second scheduling queue.

In the example of the present disclosure, there are two types of packets for non-target service types: original packets and encapsulated packets. When the packet of the non-target service type is the original packet, the gateway of the second data center can directly forward the original packet in the second scheduling queue when forwarding the packet in the second scheduling queue.

When the packet of the non-target service type is the encapsulated packet, the gateway of the second data center can obtain the original packet corresponding to the packet in the second scheduling queue; then forward the original packet to the second data center. For example, the encapsulated packet is an SRv6 packet. When the gateway of the second data center forwards the packet in the second scheduling queue, the SRv6 encapsulation of the packet in the second scheduling queue can be removed to obtain the original packet, and then the original packet is forwarded to the second data center.

In some examples, storing the first packet in the first scheduling queue in block S103 may comprise: if a packet of any other service type have been stored in the first scheduling queue, the intermediate device emptying the first scheduling queue; and storing the first packet in the emptied first scheduling queue. For the specific implementation, please refer to the above-mentioned description of FIG. 9, which will not be repeated here.

In some examples, as shown in FIG. 11, when the network device is the gateway of the second data center, block S104 in FIG. 10 may comprise blocks S111-S112.

In block S111, the SRv6 encapsulation of the packet in the first scheduling queue is removed to obtain the original packet.

Wherein, the packet of the target service type is an SRv6 packet, and the packet in the first scheduling queue is a packet of the target service type. When the gateway of the second data center forwards the packet in the first scheduling queue, the SRv6 encapsulation of the packet in the first scheduling queue is removed to obtain the original packet.

In block S112, the original packet is forwarded to the second host in the second data center.

In the example of the present disclosure, the gateway of the second data center removes the SRv6 encapsulation of the first packet to obtain the original packet, and then forwards the original packet to the second host in the second data center, which is convenient for the second host in the data center to process the original packet.

In this example of the present disclosure, a controller can be deployed in the WAN, such as the controller in FIG. 4, and the controller can be an SDN (Software Defined Network) controller or controller of another type.

The information pre-stored in the gateway of the first data center, the intermediate device and the gateway of the second data center, such as the SID list, the first scheduling queue corresponding to the deterministic flow to which the packet of the target service type belongs, the scheduling period of the first scheduling queue, the packet characteristic for the target service type, the correspondence between the first scheduling queue and the segment identifier of the network device in the target segment list, and the encapsulation information of the SRv6 packet, can be uniformly issued by the controller.

The specific implementation can be as follows.

The controller issues first path information to each network device, wherein the first path information comprises scheduling information and the scheduling period of the first scheduling queue, and the scheduling information indicates that the deterministic flow to which the packet of the target service type belongs corresponds to the first scheduling queue; the network device stores that received first path information, associates the deterministic flow to which the packet of the target service type belongs with the first scheduling queue in the network device based on the first path information, and configures the scheduling period of the first scheduling queue in the network device according to the scheduling period comprised in the first path information.

The controller issues second path information to each network device, wherein the second path information one or more of: the target segment list corresponding to the specified path, the packet characteristic for the target service type, and the correspondence between the first scheduling queue and the segment identifier of the network device in the target segment list; the network device stores the received second path information, and performs at least one of the following operations based on the first path information:

associating the specified path with the target segment list;
  associating the packet characteristic for the target service type with the deterministic flow to which the packet of the target service type belongs;
  establishing the correspondence between the first scheduling queue and the segment identifier of the network device in the target segment list.

In this example of the present disclosure, all information comprised in the first path information and the second path information can be issued by the controller; part of the information comprised in the first path information and the second path information is issued by the controller, and the information not issued by the controller is replaced by the information stored locally by the network device.

For example, if the controller issues the first path information without issuing the second path information, when forwarding the packet of the target service type, the network device will configure the relevant information in the network device based on the first path information issued by the controller and the second path information pre-stored by the network device to assistant the network device to forward the packet.

The controller completes the configuration of path information in each network device, which facilitates the unified management of each network device in the WAN and ensures the deterministic transmission of the packet of the target service type.

In order to determine the accurate path information, the controller can collect the specified network resource information of the WAN and establish the whole network resource model. The specified network resource information may comprise one or more of: network topology information, network bandwidth, network time delay and network jitter. In addition, the controller collects the transmission indicator of the deterministic flow of the target service type, calculates the deterministic path satisfying the transmission indicator and the encapsulation information of SRv6 packet according to the collected specified network resource information and the transmission indicator of the deterministic flow combined with the packet characteristic for the target service type to obtain the first path information and the second path information.

In some examples, the controller can obtain specified network resource information by detecting the WAN through an in-band network telemetry. The specified network resource information obtained through detection based on in-band network telemetry can accurately estimate the time delay and jitter required by each path, and then determine the deterministic path that meets the transmission indicator, and send the first path information and the second path information corresponding to the deterministic path to each network device. In this example, the time delay and jitter required by each path can be accurately estimated by in-band network telemetry. At this time, even if the above data processing method is executed only by the gateways of data centers at both ends without the intermediate devices, the selected deterministic path can be guaranteed to be valid within the QoS (Quality of Service) constraint range, and deterministic transmission can be realized, which reduces the requirements on the intermediate devices and further saves the network deployment cost.

In this example of the present disclosure, the controller can flexibly schedule the resources of the WAN according to the specific service requirements, without occupying fixed bandwidth and other network resources, thus improving the network use efficiency.

In addition, the data processing method provided by the example of the present disclosure has high network use efficiency and low requirements on network device, realizes deterministic transmission with bounded time delay, and can support more future application scenarios with WAN lossless requirements.

The data processing method provided by the example of the present disclosure will be describe below with reference to FIG. 4.

Block 1: A host for a RDMA service in data center 1 sends an original packet to gateway PE1 through lossless network technology in data center 1.

PE1 carries out the WAN data processing process starting from receiving the original packet. See Block 2.

Block 2: PE1 identifies the packet of the RDMA service according to the packet characteristic for the RDMA service configured by the controller, performs mapping, deterministic processing and scheduling, performs smooth shaping on the packet according to the period, encapsulates it to obtain a corresponding SRv6 packet, and sends it to the intermediate device P. Please refer to the above description for FIGS. 5-9.

Block 3: the device P analyzes the SID information carried in the SRv6 packet, performs deterministic related processing scheduling, and sends the SRv6 packet to the gateway PE2 of the data center 2. For details, please refer to the above description for FIG. 5 and FIG. 10.

The device P here can be P1, P2, P5 or P6 in the above-mentioned FIG. 4.

Block 4: PE2 performs deterministic processing scheduling according to the SID information carried in the SRv6 packet, removes the SRv6 encapsulation, and sends the original packet to the device inside the data center 2. At this point, the data processing in the WAN is finished. For details, please refer to the above description for FIG. 5 and FIGS. 10-11.

Block 5: the device inside the data center 2 sends the original packet to the RDMA service host through the internal lossless network technology.

In the example of the present disclosure, in the data processing process of other service types, only the best-effort mode is required.

In the example of the present disclosure, the deterministic solution of WAN is combined with the lossless network technology in the data center, which can reduce the packet loss rate and realize the deterministic and bounded delay in the transmission process of RoCE service packets, and expand the lossless network technology from inside the data center to the WAN, thus achieving the effect of end-to-end lossless network across data centers.

In addition, the network device supports the scheduling queue reservation function, that is, when there is no packet of the target service type in the WAN, the packets of other service types can be stored in the scheduling queue corresponding to the deterministic flow to which the packets of RDMA services belong, and the end-to-end deterministic lossless transmission can be realized by accurately identifying, mapping, encapsulating and scheduling the packets of RDMA services.

Based on the network topology shown in FIG. 12, the data processing method provided by the example of the present disclosure is tested in a laboratory environment. In FIG. 12, the packet of an RoCE service runs on server 1 and server 2. Server 1 and server 2 are connected to switches SW1 and SW2 respectively, and a damage meter is inserted between SW1 and SW2 to simulate the delay and jitter of a WAN. The port rates of connections between devices are 10 G, respectively.

During the test, server 1 and server 2 send RoCE service packets, and simulate the delay and jitter parameters on the damage meter to observe and record the throughput of RoCE services.

Analysis based on the test results shows that:

1. The final effect of jitter on RoCE service packets is time delay. From the test results, the throughput of RoCE services is affected by the overall time delay: fixed time delay+jitter.

2. When the overall time delay is within 7 ms (700 km transmission distance), the RoCE service packet is not affected, and the throughput of RoCE services is 100%.

3. When the overall time delay is 10 ms (1000 km transmission distance), the throughput of RoCE services is 65%.

4. When the overall time delay is 15 ms (1500 km transmission distance), the throughput of RoCE services is 45%.

From the actual test, it can be determined that the data processing method provided by the example of the present disclosure can strictly control the jitter within 20 us when realizing the deterministic transmission of the WAN.

To sum up, the data processing method provided by the example of the present disclosure can realize zero packet loss and deterministic and bounded time delay of RoCE service in wide area transmission, and achieve the availability of RDMA service across data centers.

Corresponding to the above data processing method, an example of the present disclosure provides a data processing apparatus, as shown in FIG. 13, which is applied to a network device in a WAN, wherein the network device is located on a specified path from a gateway of a first data center to a gateway of a second data center, and the apparatus comprises:

a first storage unit 131, to store an acquired first packet of a target service type in a first scheduling queue corresponding to a deterministic flow to which the first packet belongs, wherein a source address of the first packet is an address of a first host in the first data center, a destination address of the first packet is an address of a second host in the second data center, and a forwarding path of the deterministic flow to which the first packet belongs is the specified path;

a forwarding unit 132, to forward the packet in the first scheduling queue when a scheduling period of the first scheduling queue is reached.

In some examples, the network device is the gateway of the first data center. The first storage unit 131 can be specifically to:

receive a second packet, wherein a source address of the second packet is the address of the first host in the first data center, and a destination address of the second packet is the address of the second host in the second data center;

generate the first packet forwarded along the specified path based on the second packet if a characteristic of the second packet matches a pre-configured packet characteristic for the target service type;

store the first packet in the first scheduling queue, which is a scheduling queue corresponding to the deterministic flow to which the first packet belongs.

In some examples, the first storage unit 131 may be specifically to:

obtain a target segment list corresponding to the specified path, wherein a segment identifier of the network device in the target segment list corresponds to the first scheduling queue;

encapsulate the second packet as the first packet based on the target segment list, wherein the first packet is an SRv6 packet.

In some examples, the first storage unit 131 may be further to determine a second scheduling queue according to whether a packet of the target service type is received within a preset duration before a current moment if the characteristic of the second packet does not match the pre-configured packet characteristic for the target service type, and store the second packet in the second scheduling queue;

and the forwarding unit 132 may be further to forward the packet in the second scheduling queue according to a forwarding strategy corresponding to the second scheduling queue.

In some examples, the network device is an intermediate device on the specified path or the gateway of the second data center, and the packet of the target service type is an SRv6 packet;

the first storage unit 131 can be specifically to:

receive a second packet, wherein a source address of the second packet is the address of the first host in the first data center, and a destination address of the second packet is the address of the second host in the second data center;

obtain a target segment list from the second packet if the second packet is the SRv6 packet and the network device supports SRv6;

if a segment identifier of the network device in the target segment list corresponds to the first scheduling queue, take the second packet as the first packet of the target service type, and store the first packet in the first scheduling queue, which is a scheduling queue corresponding to the deterministic flow to which the first packet belongs.

In some examples, the first storage unit 131 may be further to:

determine a second scheduling queue according to whether a packet of the target service type is received within a preset duration before a current moment if the second packet is not the SRv6 packet, or the network device does not support SRv6, or the target segment list is not obtained, or there is no scheduling queue corresponding to the segment identifier of the network device in the target segment list, and store the second packet in the second scheduling queue;

and the forwarding unit 132 may be further to forward the packet in the second scheduling queue according to a forwarding strategy corresponding to the second scheduling queue.

In some examples, when the network device is the gateway of the second data center; the forwarding unit 132 may be specifically to:

obtain an original packet corresponding to the packet in the second scheduling queue;

forward the original packet to the second host in the second data center according to the forwarding strategy corresponding to the second scheduling queue.

In some examples, when the network device is the gateway of the second data center; the forwarding unit 132 may be specifically to:

remove SRv6 encapsulation of the packet in the first scheduling queue to obtain the original packet;

forward the original packet to the second host in the second data center.

In some examples, the first storage unit 131 may be specifically to:

determine the second scheduling queue from all scheduling queues in the network device if the packet of the target service type is not received within the preset duration before the current moment;

determine the second scheduling queue from all scheduling queues in the network device except the first scheduling queue if the packet of the target service type is received within the preset duration before the current moment.

In some examples, the forwarding unit 132 may be specifically to:

forward the packet(s) in the second scheduling queue in a first-in-first-out mode; or, forward the packet in the second scheduling queue when a scheduling period of the second scheduling queue is reached.

In some examples, the first storage unit 131 may be specifically to:

empty the first scheduling queue if a packet of any other service type is stored in the first scheduling queue;

store the first packet in the emptied first scheduling queue.

In some examples, the above data processing apparatus may further comprise:

a first receiving unit, to receive first path information issued by a controller, wherein the first path information comprises scheduling information and the scheduling period of the first scheduling queue, and the scheduling information indicates that the deterministic flow to which the packet of the target service type belongs corresponds to the first scheduling queue;

a first configuring unit, to associate the deterministic flow to which the packet of the target service type belongs with the first scheduling queue in the network device, and configuring the scheduling period of the first scheduling queue in the network device according to the scheduling period comprised in the first path information.

In some examples, the above data processing apparatus may further comprise:

a second receiving unit, to receive second path information issued by the controller, wherein the second path information comprises one or more of: a target segment list corresponding to the specified path, a packet characteristic for the target service type, and a correspondence between the first scheduling queue and a segment identifier of the network device in the target segment list;

a second configuring unit, to perform at least one of following operations according to the second path information:

associating the specified path with the target segment list;

associating the packet characteristic for the target service type with the deterministic flow to which the packet of the target service type belongs;

establishing the correspondence between the first scheduling queue and the segment identifier of the network device in the target segment list.

In some examples, the first path information and the second path information may be determined by the controller according to specified network resource information of the WAN and a transmission indicator of the deterministic flow of the target service type.

In some examples, the specified network resource information may be obtained by detecting, by the controller, the WAN through an in-band network telemetry.

In some examples, the specified network resource information may comprise one or more of: network topology information, network bandwidth, network time delay and network jitter.

In the data processing apparatus provided by the example of the present disclosure, the network device in a WAN stores the packet of a target service type with high requirements on network transmission reliability, such as RDMA services, in a specified scheduling queue, and forwards the packet in the scheduling queue when the scheduling period of the scheduling queue is reached. Because the scheduling period of the specified scheduling queue is determined, forwarding the packet of the target service type with high requirements on network transmission reliability in the scheduling period of the specified scheduling queue can ensure that the transmission delay and jitter of the packet of the target service type are limited, realize the deterministic and bounded time delay transmission of the packet of the target service type, reduce the packet loss caused by uncertain time delay and jitter, and improve the performance of RDMA services and other services with high requirements on network transmission reliability when applied to the WAN.

In the data processing apparatus provided by the example of the present disclosure, only by improving the software of the network device, the packet in the corresponding scheduling queue can be forwarded according to the specified scheduling period, and the deterministic and bounded time delay transmission of the service packet with high requirements on network transmission reliability can be realized. Compared with adopting the complexity technology in which expensive hardware is arranged on the network device to be specially used for transmitting service packets with high requirements on network transmission reliability, the technical solution provided by the example of the present disclosure reduces the requirements on the network device and saves the network deployment cost.

An example of the present disclosure also provides a network device, as shown in FIG. 14, which comprises a processor 141 and a machine-readable storage medium 142. The machine-readable storage medium 142 have stored therein machine-executable instructions that can be executed by the processor 141 to cause the processor 141 to perform the method described in any of the examples of FIGS. 4-12 above.

In this example of the present disclosure, the network device may be a gateway of the first data center, an intermediate device or a gateway of the second data center.

The machine readable storage medium may include a random access memory (RAM), or may include a non-volatile memory (NVM), for example at least one disk memory. Optionally, the machine readable storage medium may also be at least one storage apparatus located away from the processor described above.

The processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic apparatus, a discrete gate or transistor logic apparatus, a discrete hardware component.

In yet another example of the present disclosure, a machine-readable storage medium is also provided having stored therein a computer program which, when executed by a processor, cause the processor to perform he method described in any of the above-mentioned examples of FIGS. 2-12.

In yet another example of the present disclosure, a computer program is also provided which, when executed by a processor, causes the processor to perform the method described in any of the above-mentioned examples of FIGS. 2-12.

In the aforementioned examples, it may be implemented in whole or in part by software, hardware, firmware, or any combination thereof. When implemented by software, it may be implemented in whole or in part in the form of a computer program product. The computer program product comprises one or more computer instructions. The processes or functions described in accordance with the examples of the present disclosure is produced in whole or in part, when the computer program instructions are loaded and executed on a computer. The computer may be a general-purpose computer, a dedicated computer, a computer network, or other programmable apparatus. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage apparatus such as a server or a data center containing one or more available medium integrations. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover non-exclusive inclusions, so that processes, methods, articles or apparatuses comprising a series of elements comprise not only those elements listed but also those not specifically listed or the elements intrinsic to these processes, methods, articles, or apparatuses. Without further limitations, elements defined by the sentences "comprise(s) a" or "include(s) a" do not exclude that there are other identical elements in the processes, methods, articles, or apparatuses which comprise these elements.

All the examples are described in corresponding ways, same or similar parts in each of the examples may be referred to one another, and the parts emphasized are differences to other examples. It should be noted that, for examples of the apparatus, network apparatus, storage medium, and computer program, since they are substantially similar to the examples of the method, their description is relatively simple, and for the related aspects, one only needs to refer to portions of the description of the examples of the method.

The examples described above are merely preferred examples of the present disclosure, and not intended to limit the scope of the present disclosure. Any modifications, equivalents, improvements or the like within the spirit and principle of the application should be included in the scope of the application.

What is claimed is:

1. A data processing method, which is applied to a network device in a WAN, wherein the network device is located on a specified path from a gateway of a first data center to a gateway of a second data center, the network device is the gateway of the first data center; the method comprises:

storing an acquired first packet of a target service type in a first scheduling queue corresponding to a deterministic flow to which the first packet belongs, wherein a source address of the first packet is an address of a first host in the first data center, a destination address of the first packet is an address of a second host in the second data center, and a forwarding path of the deterministic flow to which the first packet belongs is the specified path; wherein storing the acquired first packet of the target service type in the first scheduling queue corresponding to the deterministic flow to which the first packet belongs, comprises:

receiving a second packet, wherein a source address of the second packet is the address of the first host in the first data center, and a destination address of the second packet is the address of the second host in the second data center;

generating the first packet forwarded along the specified path based on the second packet if a characteristic of the second packet matches a pre-configured packet characteristic for the target service type; and storing the first packet in the first scheduling queue, which is a scheduling queue corresponding to the deterministic flow to which the first packet belongs;

forwarding the packet in the first scheduling queue when a scheduling period of the first scheduling queue is reached;

determining a second scheduling queue according to whether a packet of the target service type is received within a preset duration before a current moment, if the characteristic of the second packet does not match the pre-configured packet characteristic for the target service type;

storing the second packet in the second scheduling queue; and forwarding the packet in the second scheduling queue according to a forwarding strategy corresponding to the second scheduling queue.

2. The method of claim 1, wherein generating the first packet forwarded along the specified path based on the second packet, comprises:

obtaining a target segment list corresponding to the specified path, wherein a segment identifier of the network device in the target segment list corresponds to the first scheduling queue;

encapsulating the second packet as the first packet based on the target segment list, wherein the first packet is an SRv6 packet.

3. A data processing method, which is applied to a network device in a WAN, wherein the network device is located on a specified path from a gateway of a first data center to a gateway of a second data center, the method comprises:

storing an acquired first packet of a target service type in a first scheduling queue corresponding to a deterministic flow to which the first packet belongs, wherein a source address of the first packet is an address of a first host in the first data center, a destination address of the first packet is an address of a second host in the second data center, and a forwarding path of the deterministic flow to which the first packet belongs is the specified path; and forwarding the packet in the first scheduling queue when a scheduling period of the first scheduling queue is reached, wherein the network device is an intermediate device on the specified path or the gateway of the second data center, and the packet of the target service type is an SRv6 packet;

storing the acquired first packet of the target service type in the first scheduling queue corresponding to the deterministic flow to which the first packet belongs, comprises:

receiving a second packet, wherein a source address of the second packet is the address of the first host in the first data center, and a destination address of the second packet is the address of the second host in the second data center;

obtaining a target segment list from the second packet if the second packet is an SRv6 packet and the network device supports SRv6;

if a segment identifier of the network device in the target segment list corresponds to the first scheduling queue, taking the second packet as the first packet of the target service type, and storing the first packet in the first scheduling queue, which is a scheduling queue corresponding to the deterministic flow to which the first packet belongs.

4. The method of claim 3, further comprising:

determining a second scheduling queue according to whether a packet of the target service type is received within a preset duration before a current moment, if the second packet is not the SRv6 packet, or the network device does not support SRv6, or the target segment list is not obtained, or there is no scheduling queue corresponding to the segment identifier of the network device in the target segment list;

storing the second packet in the second scheduling queue;

forwarding the packet in the second scheduling queue according to a forwarding strategy corresponding to the second scheduling queue.

5. The method of claim 4, wherein when the network device is the gateway of the second data center, forwarding the packet in the second scheduling queue according to the forwarding strategy corresponding to the second scheduling queue, comprises:

obtaining an original packet corresponding to the packet in the second scheduling queue;

forwarding the original packet to the second host in the second data center according to the forwarding strategy corresponding to the second scheduling queue.

6. The method of claim 4, wherein when the network device is the gateway of the second data center, forwarding the packet in the first scheduling queue comprises:

removing SRv6 encapsulation of the packet in the first scheduling queue to obtain the original packet;

forwarding the original packet to the second host in the second data center.

7. The method of claim 1, wherein determining the second scheduling queue according to whether the packet of the target service type is received within the preset duration before the current moment, comprises:

determining the second scheduling queue from all scheduling queues in the network device if the packet of the target service type is not received within the preset duration before the current moment;

determining the second scheduling queue from all scheduling queues in the network device except the first scheduling queue, if the packet of the target service type is received within the preset duration before the current moment.

8. The method of claim 1, wherein forwarding the packet in the second scheduling queue according to the forwarding strategy corresponding to the second scheduling queue, comprises:

forwarding the packet(s) in the second scheduling queue in a first-in-first-out mode; or, forwarding the packet in the second scheduling queue when a scheduling period of the second scheduling queue is reached.

9. The method of claim 1, wherein storing the first packet in the first scheduling queue, comprises:

emptying the first scheduling queue if a packet of any other service type is stored in the first scheduling queue;

storing the first packet in the emptied first scheduling queue.

10. The method of claim 1, further comprising:

receiving first path information issued by a controller, wherein the first path information comprises scheduling information and the scheduling period of the first scheduling queue, and the scheduling information indicates that the deterministic flow to which the packet of the target service type belongs corresponds to the first scheduling queue;

associating the deterministic flow to which the packet of the target service type belongs with the first scheduling queue in the network device, and configuring the scheduling period of the first scheduling queue in the network device according to the scheduling period comprised in the first path information.

11. The method of claim 10, further comprising:

receiving second path information issued by the controller, wherein the second path information comprises one or more of: a target segment list corresponding to the specified path, a packet characteristic for the target service type, and a correspondence between the first scheduling queue and a segment identifier of the network device in the target segment list;

performing at least one of following operations according to the second path information:

associating the specified path with the target segment list;

associating the packet characteristic for the target service type with the deterministic flow to which the packet of the target service type belongs;

establishing the correspondence between the first scheduling queue and the segment identifier of the network device in the target segment list.

12. The method of claim 11, wherein the first path information and the second path information are determined by the controller according to specified network resource information of the WAN and a transmission indicator of the deterministic flow of the target service type.

13. The method of claim 12, wherein the specified network resource information is obtained by detecting, by the controller, the WAN through an in-band network telemetry.

14. The method of claim 12, wherein the specified network resource information comprises one or more of: network topology information, network bandwidth, network time delay and network jitter.

15. A network device, which comprises a processor and a machine-readable, non-transitory, storage medium having stored therein a computer program that can be executed by the processor to cause the processor to perform the method of claim 1.

16. A non-transitory machine-readable storage medium having stored therein a computer program which, when executed by a processor, cause the processor to perform the method of claim 1.

17. The method of claim 3, further comprising:

receiving first path information issued by a controller, wherein the first path information comprises scheduling information and the scheduling period of the first scheduling queue, and the scheduling information indicates that the deterministic flow to which the packet of the target service type belongs corresponds to the first scheduling queue; and associating the deterministic flow to which the packet of the target service type belongs with the first scheduling queue in the network device, and configuring the scheduling period of the first scheduling queue in the network device according to the scheduling period comprised in the first path information.

18. The method of claim 17, further comprising:

receiving second path information issued by the controller, wherein the second path information comprises one or more of: a target segment list corresponding to the specified path, a packet characteristic for the target service type, and a correspondence between the first scheduling queue and a segment identifier of the network device in the target segment list;

performing at least one of following operations according to the second path information:

associating the specified path with the target segment list;

associating the packet characteristic for the target service type with the deterministic flow to which the packet of the target service type belongs; and establishing the correspondence between the first scheduling queue and the segment identifier of the network device in the target segment list.

19. The method of claim 18, wherein the first path information and the second path information are determined by the controller according to specified network resource information of the WAN and a transmission indicator of the deterministic flow of the target service type.

20. The method of claim 19, wherein the specified network resource information is obtained by detecting, by the controller, the WAN through an in-band network telemetry.

* * * * *